United States Patent [19]

Takeda et al.

[11] Patent Number: 5,327,282
[45] Date of Patent: Jul. 5, 1994

[54] OPTICAL AMPLIFIER FOR 1.3 μM BAND

[75] Inventors: Keiko Takeda; Shinya Inagaki; Kenji Tagawa, all of Kawasaki, Japan

[73] Assignee: Fujitsu Limited, Kawasaki, Japan

[21] Appl. No.: 26,513

[22] Filed: Mar. 4, 1993

[30] Foreign Application Priority Data

Mar. 4, 1992 [JP] Japan .................................. 4-46528

[51] Int. Cl.⁵ .............................................. H01S 3/00
[52] U.S. Cl. .................................................... 359/341
[58] Field of Search ....................... 359/341, 343; 372/6

[56] References Cited

U.S. PATENT DOCUMENTS 4,712,075 12/1987 Snitzer .......................... 372/6 X
5,251,062 10/1993 Snitzer et al. ................. 359/341

Primary Examiner—Mark Hellner

[57] ABSTRACT

Disclosed is an optical amplifier, wherein efficient optical amplification of signal light of 1.3 μm band is made achievable by optically exiting a doped fiber doped with Pr (praseodymium) alone, or together with other rare earth element, or a similar optical waveguide arrangement, and then supplying the optical waveguide arrangement with the signal light.

16 Claims, 17 Drawing Sheets

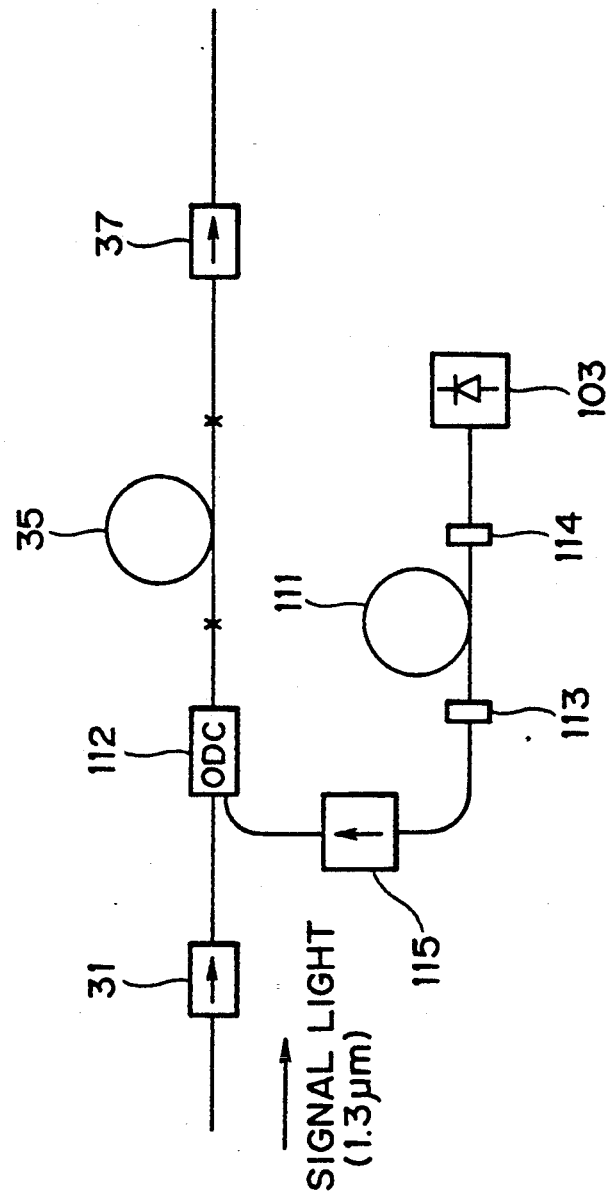

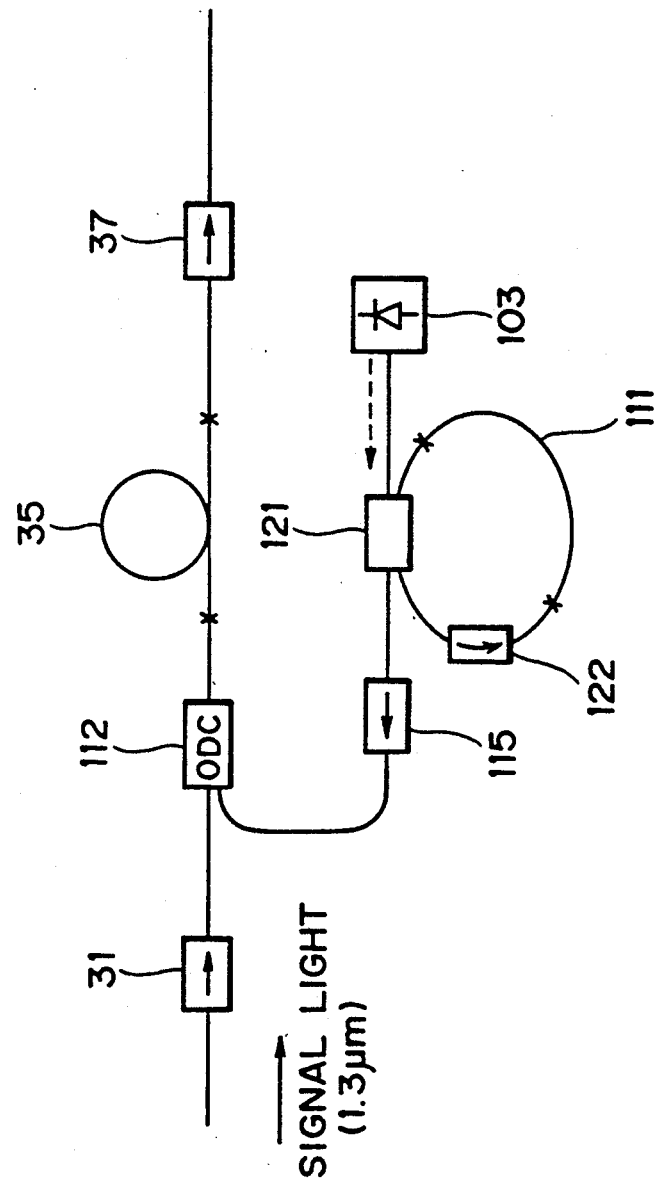

OPTICAL AMPLIFIER FOR 1.3 μM BAND

BACKGROUND OF THE INVENTION

1. Field of the Invention

The present invention relates to an optical amplifier capable of efficiently amplifying signal light of 1.3 μm band.

An optical amplifier directly amplifying an optical signal as it is, without converting the optical signal into an electrical signal, is substantially bit rate-free and has such features that it facilitates construction of a large-capacity system and enables multiple channels to be amplified en bloc. Because of such features, intensive studies are being made in various research institutions on the optical amplifier as one of the key devices in the optical communication system for future. As one of the types of such optical amplifier, there is an optical fiber amplifier using a doped fiber, an optical fiber chiefly the core of which is doped with a rare earth element such as Er (erbium). The optical fiber amplifier has such excellent characteristics that it provides high gain, the gain is not dependent on polarization, it produces low noise, and it incurs little connection loss at its connection with an optical fiber as a transmission line. Hence, research on the development of an arrangement suitable for the wavelength of signal light to be amplified is being made in various fields.

1. Description of the Related Art

As an optical fiber amplifier for amplifying signal light of 1.5 μm wavelength band, one using Er as the doping element is well known. This optical fiber amplifier has already reached a status as practicable device exhibiting low noise and highly efficient optical amplification. On the other hand, as an optical fiber amplifier for amplifying signal light of 1.3 μm wavelength band, one using Nd (neodymium) as the doping element is being under development. However, since the fluorescence peak of Nd has a slightly longer wavelength than the 1.3 μm wavelength band, there is a problem with the optical fiber amplifier using Nd as the doping element that a sufficient gain cannot be obtained. Further, it emits light in the vicinity of the wavelength 1.0 μm and this adversely affects the stimulated emission of the 1.3 μm wavelength band. Although there have been made such proposals as to shift the wavelength of the fluorescence peak toward the lower wavelength side by changing the composition of the glass forming the doped fiber or to remove the fluorescent light of 1.0 μm wavelength band by inserting an optical coupler in the device, it is the present state that only a gain around 10 dB can be obtained from it.

SUMMARY OF THE INVENTION

An object of the present invention is to provide an optical amplifier of 1.3 μm band having a sufficient gain.

According to an aspect of the present invention, there is provided an optical amplifier amplifying signal light of 1.3 μm band comprising an optical waveguide having a waveguide region which is doped with Pr and of which a first end is supplied with the signal light, pumping means for causing optical excitation in the waveguide region, and booster means for increasing power density of fluorescence of 1.45 μm band generated in the waveguide region incidentally to optical amplification of the signal light, wherein the signal light undergone amplification is output from a second end of the waveguide region.

Preferably the optical waveguide is a doped fiber whose principal ingredient is SiO2, and the waveguide region is the core of the doped fiber.

According to another aspect of the present invention, there is provided an optical amplifier amplifying signal light of 1.3 μm band comprising an optical waveguide having a waveguide region which is doped with Pr and at least one of Nd and Yb of which a first end is supplied with the signal light, a light source outputting light of 0.8 μm band, optical coupling means for supplying the light of 0.8 μm band from the light source to the waveguide region, and a first and a second optical filter disposed on the upstream and downstream sides of the waveguide region in the propagating direction of the signal light, respectively, for reflecting light of 1.0 μm band, wherein an optical resonator arrangement for the light of 1.0 μm band is formed between the first and second optical filters, the resonating optical path of the optical resonator arrangement including the waveguide region, and the signal light undergone amplification is output from a second end of the waveguide region.

According to a further aspect of the present invention, there is provided an optical amplifier amplifying signal light of 1.3 μm band comprising, an optical waveguide having a waveguide region which is doped with Pr and of of which a first end is supplied with the signal light, pumping means for outputting light of 1.0 μm band for causing optical excitation in the waveguide region, and optical coupling means for supplying the light of 1.0 μm band from the pumping means to the waveguide region, wherein the pumping means includes a laser resonator of which resonating optical path is doped with at least either of Nd and Yb and means for supplying the laser resonator with light of 0.8 μm band, and the signal light undergone amplification is output from a second end of the waveguide region.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 16 is a block diagram of an optical amplifier showing a 10th embodiment of the present invention; and FIG. 17 is a block diagram of an optical amplifier showing an 11th embodiment of the present invention.

DESCRIPTION OF THE PREFERRED EMBODIMENTS

Figure 1:
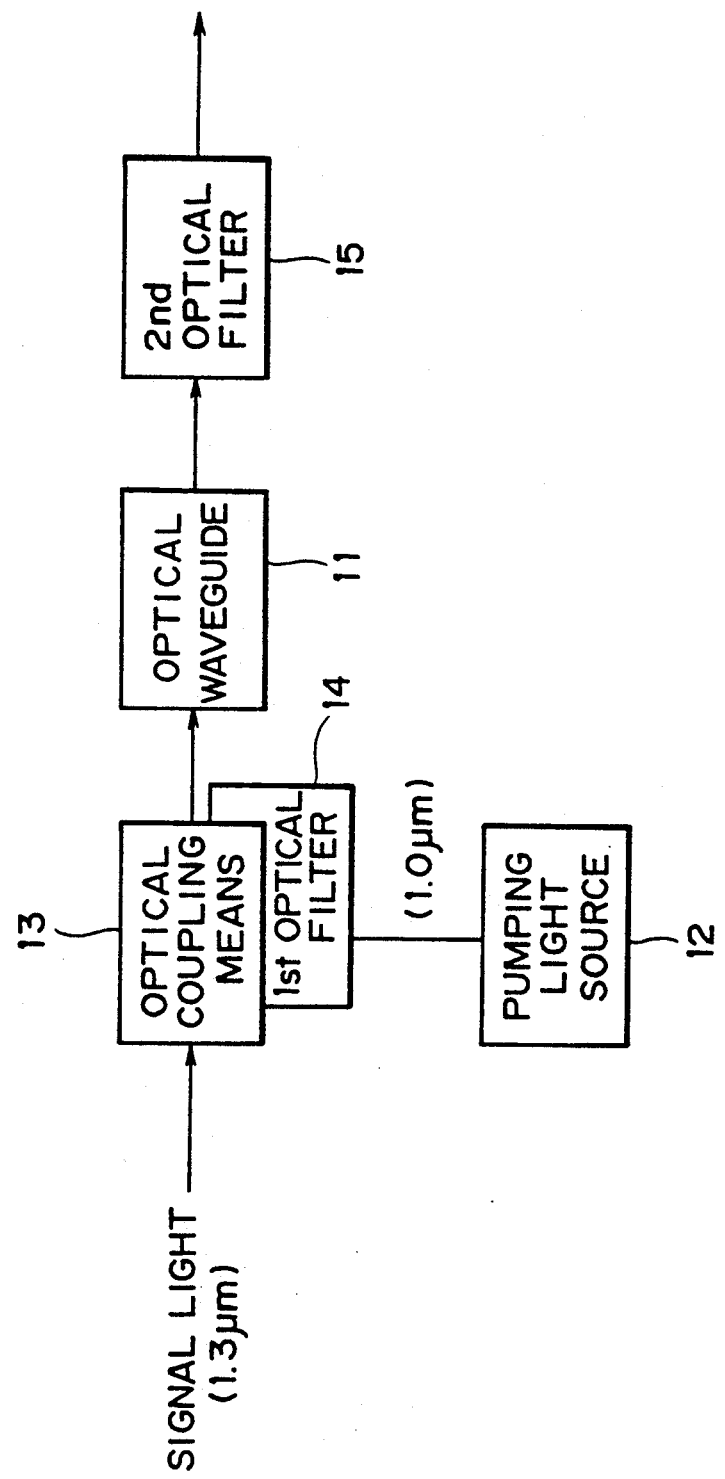
FIG. 1 is a block diagram showing a basic configuration of optical amplifiers according to the present invention.

Preferred embodiments of the present invention will be described below in detail with reference to the accompanying drawings. Throughout the drawings, substantially identical parts are denoted by the same reference numerals.

FIG. 1 is a diagram showing a basic configuration of the optical amplifier according to the present invention. An optical waveguide 11 has a waveguide region doped with Pr (praseodymium). First end of the waveguide region is supplied with signal light of 1.3 $\mu$m band. In order to optically excite the waveguide region, there are used a pumping light source 12 and an optical coupling means 13. The pumping light source 12 emits pumping light of 1.0 $\mu$m band. The optical coupling means 13 supplies pumping light from the pumping light source 12 to the waveguide region of the optical waveguide 11. In order to increase the power density of the fluorescence of 1.45 $\mu$m band generated accompanying the optical amplification of the signal light in the optical waveguide 11, there are provided a first and a second optical filter 14 and 15 on the upstream and downstream sides of the optical waveguide 11, respectively, in the propagating direction of the signal light. The first optical filter 14 at least has a function to reflect fluorescence and further has additional functions in accordance with its various locations as described later. The second optical filter 15 both reflects fluorescence and transmits amplified signal light therethrough. The amplified signal light is output from the second end of the waveguide region of the optical waveguide 11 by way of the second optical filter 15. Although, in the case of FIG. 1, the optical coupling means 13 is on the upstream side of the optical waveguide 11 in the propagating direction of the signal light, it may be located on the downstream side.

Figure 2:
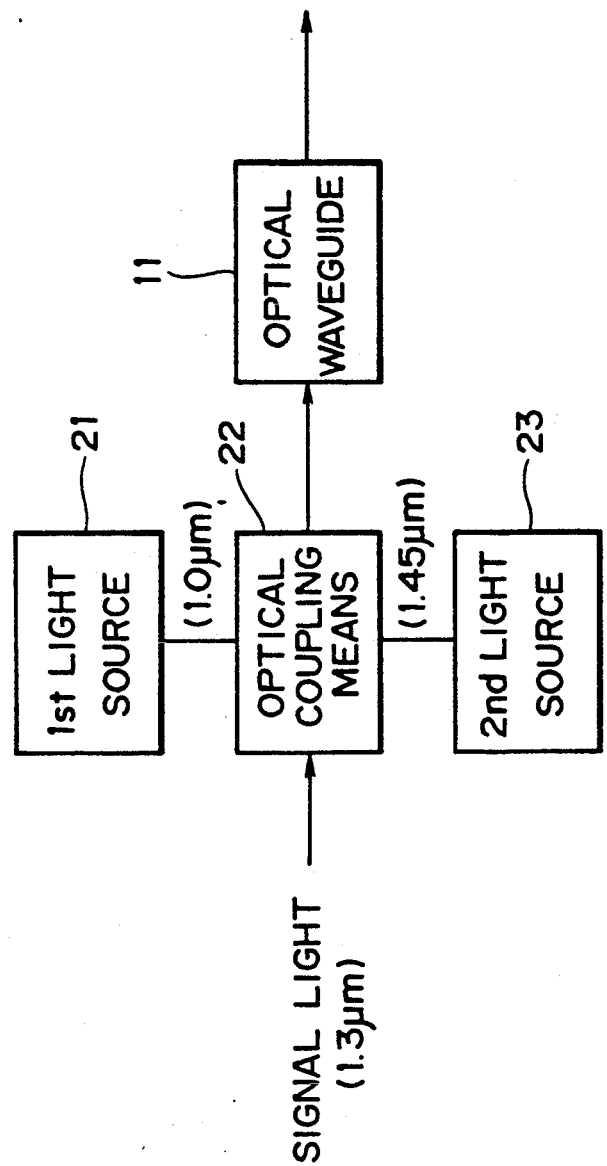
FIG. 2 is a block diagram showing another basic configuration of optical amplifiers according to the present invention.

FIG. 2 is a diagram showing another basic configuration of the optical amplifier according to the present invention. In order to optically excite the waveguide region of the optical waveguide 11, there are provided a first light source 21 and an optical coupling means 22. The first light source 21 outputs pumping light of 1.0 $\mu$m band similarly to the pumping light source 12 in FIG. 1. The optical coupling means 22 supplies the pumping light from the first light source 21 to the waveguide region of the optical waveguide 11. The present basic configuration is characterized in that a second light source 23 is used to increase the power density of fluorescence of 1.45 $\mu$m band. The second light source 23 outputs light of 1.45 $\mu$m band. The light of 1.45 $\mu$m band is supplied to the waveguide region of the optical waveguide 11 through the optical coupling means 22. Amplified signal light is output from the second end of the waveguide region of the optical waveguide 11. The optical coupling means 22 may be located on the downstream side of the optical waveguide 11 in the propagating direction of the signal light.

Figure 3:
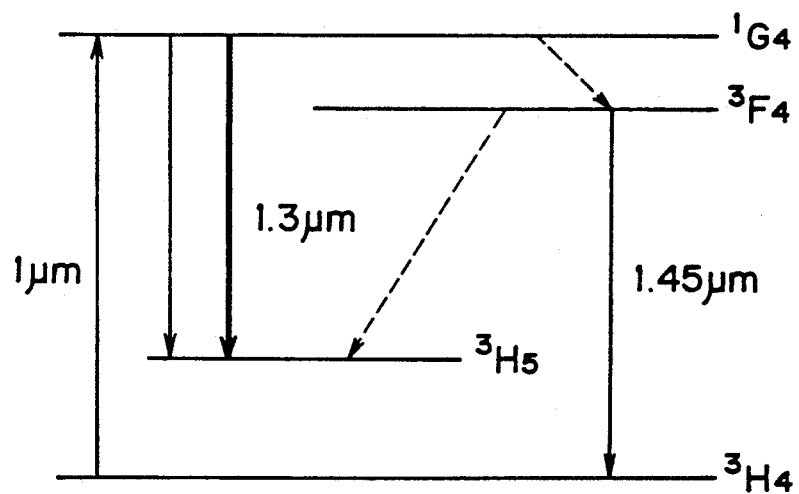
FIG. 3 is an explanatory diagram of the principle of optical amplification in the basic configurations of FIG. 1 and FIG. 2.

FIG. 3 is an explanatory diagram of the principle of optical amplification effected in the basic configurations of FIG. 1 and FIG. 2. Pr at the normal level $^3H_4$ is excited by pumping light of 1.0 $\mu$m band to an energy level $^1G_4$ and it, when transiting from this state to an energy level $^3H_5$, produces stimulated emission at 1.3 $\mu$m band. As a result, signal light of 1.3 $\mu$m band is amplified. In parallel with this, Pr at the excited level $^1G_4$ suffers thermal relaxation and transits to an energy level $^3F_4$ and, when transiting from this level to the normal level $^3H_4$, it emits fluorescence of 1.45 $\mu$m band. At this time, there is a danger that, as the result of thermal relaxation of Pr from the energy level $^3F_4$ to the energy level $^3H_5$, Pr at the energy level $^3H_5$ becomes excessive. When there is excessive Pr at the energy level $^3H_5$, the density of Pr at the normal level $^3H_4$ is decreased and, hence, the amplification efficiency is lowered.

In the basic configuration of FIG. 1, there is provided a resonator structure for the fluorescence of 1.45 $\mu$m band and its resonating optical path includes the waveguide region of the optical waveguide 11. As a result, stimulated emission of fluorescence takes place and the power density of the light of 1.45 $\mu$m band in the waveguide region of the optical waveguide 11 increases. On the other hand, in the basic configuration of FIG. 2, light of 1.45 $\mu$m band is supplied from the second light source 23 to the waveguide region of the optical waveguide 11. Hence, the power density of the light of 1.45 $\mu$m band increases. Thus, in the basic configuration of FIG. 1 or FIG. 2, it is arranged to positively increase the power density of the light of 1.45 $\mu$m band in the waveguide region of the optical waveguide 11, and therefore, the transition of Pr from the energy level $^3F_4$ to the normal level $^3H_4$ is caused (refer to FIG. 3), and good population inversion can be obtained at all times. Consequently, efficient amplification of the signal light of 1.3 $\mu$m band can be achieved.

Some embodiments including particular examples of the basic configurations shown in FIG. 1 and FIG. 2 will be described below.

Figure 4:
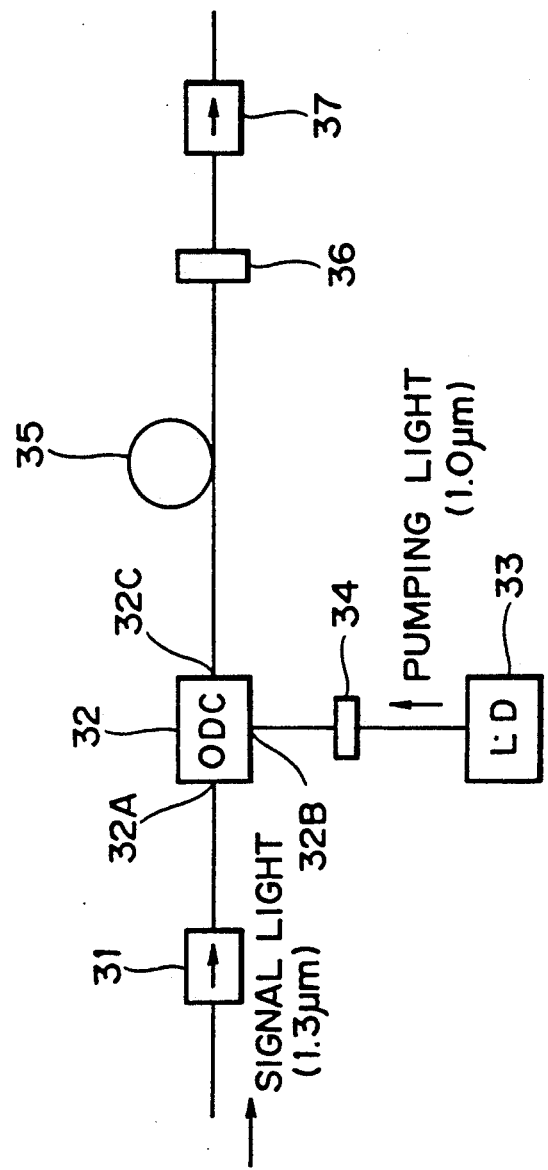
FIG. 4 is a block diagram of an optical amplifier showing a first embodiment of the present invention.

FIG. 4 is a block diagram of an optical amplifier showing a first embodiment of the present invention. Signal light of 1.3 $\mu$m band input to the amplifier to be amplified is supplied to a port 32A of an optical directional coupler 32 through an optical isolator 31. Pumping light of 1.0 $\mu$m band from a laser diode (LD) 33 is supplied to a port 32B of the coupler 32 through an optical filter 34. A port 32C of the coupler 32 is optically connected with the first end of a doped fiber 35 doped with Pt. The second end of the doped fiber 35 is connected with the input port of an optical filter 36 and the output port of the filter 36 is connected with the input port of an optical isolator 37. The term "optically connected" or "connected" used herein will include all of such cases where optical fibers are mutually connected by splicing, optical fibers are connected with each other with a connector, or connected by space beams by means of lenses. When it is difficult to obtain a laser diode 33 lasing at 1.0 μm band, a fiber laser may be structured according to later described 10th or 11th embodiment to thereby obtain pumping light of 1.0 μm band.

The optical filter 34 transmits pumping light of 1.0 μm band therethrough and reflects light of 1.45 μm band. The optical filter 36 transmits signal light of 1.3 μm band therethrough and reflects light of 1.45 μm band. By arranging such that the optical filter 36 further reflects the pumping light of 1.0 μm band, effective use of the pumping light can be achieved. As the optical filters 34 and 36, a dielectric multilayer film formed on the end face of an optical fiber or on a transparent glass substrate can be used. The optical path length between the optical filters 34 and 36 is set so that light of 1.45 μm band will resonate between these optical filters.

The doped fiber 35 has a core made of SiO2 as its principal ingredient, doped with Pt, and having a relatively high refractive index and a clad similarly made of SiO2 as its principal ingredient and having relatively low refractive index. One of the fabrication processes of the doped fiber 35 comprises the following steps of:

(a) depositing oxide glass soot to be turned into the core in a quartz reaction tube by chemical vapor deposition (CVD);

(b) impregnating a solution having a Pr compound as the solute into the oxide glass soot;

(c) evaporating the solvent of the solution impregnated into the oxide glass soot;

(d) collapsing the quartz reaction tube gone through the above steps by heating it thereby making a preform; and (e) drawing the preform, while it is heated from one end, into an optical fiber.

Figure 5:
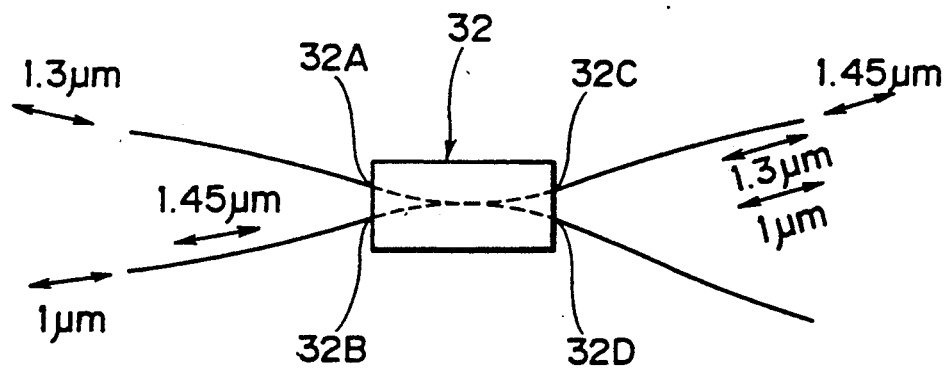
FIG. 5 is an explanatory diagram of an optical directional coupler in FIG. 4.

As the optical directional coupler 32, an optical coupler of a fusion-welded fiber type can be used. Structure and operation of the same will be described with reference to FIG. 5. This optical coupler is fabricated by stretching two optical fibers while they are heated to be fusion welded at their side faces and then solidifying the fusion-welded/stretched portion with a resin such as epoxy. The fibers sticking out of the resin become ports 32A, 32B, 32C, and 32D. Since, at the fusion-welded/stretched portion, the diameter of the portion corresponding to the core of each fiber is smaller than the original core diameter and the portions corresponding to the cores of both of the fibers are sufficiently close to each other, mode coupling of propagating light from either fiber to the other fiber is effected according to structural parameters of the fusion-welded/stretched portion (such as core diameter, outer diameter, form, length, and refractive index contrast) and wavelength of propagated light. Accordingly, by fabricating the fusion-welded/stretched portion so as to provide suitable structural parameters, it can be achieved to bring its mode coupling coefficient to virtually 0% for light of a certain wavelength and to bring its mode coupling coefficient to virtually 100% for light of a certain different wavelength. In the case of the present embodiment, light of 1.3 μm band supplied to the port 32A is output from the port 32C, and light of 1.3 μm band supplied to the port 32C is reversibly output from the port 32A. Further, light of 1 μm band and 1.45 μm band supplied to the port 32B are output from the port 32C and light 1 μm band and 1.45 μm band supplied to the port 32C are reversibly output from the port 32B. Incidentally, the port 32D is arranged to be a dead end.

Now, operation of an optical amplifier shown in FIG. 4 will be described. Signal light of 1.3 μm band is passed through the optical isolator 31 and the optical directional coupler 32 in order of mention and supplied to the doped fiber 35. Pumping light of 1.0 μm wavelength band from the LD 33 is passed through the optical filter 34 and the optical directional coupler 32 in order of mention and supplied to the doped fiber 35. Within the doped fiber 35, the doped Pr absorbs the pumping light of 1.0 μm band and comes into its excited state, and upon passing of the signal light of 1.3 μm band through the doped fiber 35 at this time, stimulated emission takes place and thereby the signal light is amplified. Fluorescence of 1.45 μm band generated within the doped fiber 35 is caused to resonate by means of the optical resonator formed of the optical filter 34, the optical directional coupler 32, the doped fiber 35, and the optical filter 36, and thereby stimulation emission is caused. As a result, the excited Pr is facilitated to return to the normal level, good population inversion is produced, and efficient optical amplification of the signal light of 1.3 μm band is achieved. The amplified signal light of 1.3 μm band is passed through the optical filter 36 and the optical isolator 37 in order of mention and transmitted over an optical transmission line, not shown.

Figure 6:
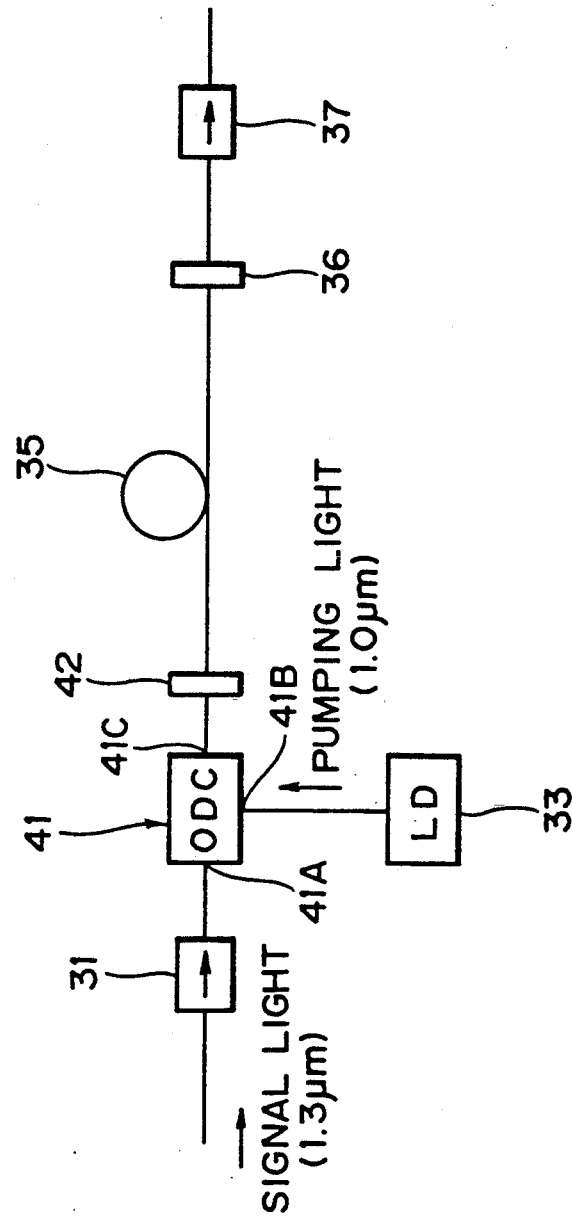
FIG. 6 is a block diagram of an optical amplifier showing a second embodiment of the present invention.

FIG. 6 is a block diagram of an optical amplifier showing a second embodiment of the present embodiment. Signal light of 1.3 μm band is supplied to a port 41A of an optical directional coupler 41 through an optical isolator 31. Pumping light of 1.0 μm band from an LD 33 is supplied to a port 41B of the optical coupler 41. These signal light and pumping light are output from a port 41C of the optical coupler 41 and supplied to a doped fiber 35 through an optical filter 42. The signal light amplified in the doped fiber 35 is passed through an optical filter 36 and then through an optical isolator 37 to be output over an optical transmission line, not shown. In the present embodiment, since the optical filter 42 is provided in the main transmission line, the optical filter 42 is arranged to transmit the signal light of 1.3 μm band and the pumping light of 1.0 μm band therethrough and to reflect fluorescence of 1.45 μm band. In the present embodiment, while the optical coupler 41 is required to perform similar function to that in the first embodiment of FIG. 4 in dealing with the light of 1.3 μm band and the light of 1.0 μm band, it is not required of any special function in dealing with the light of 1.45 μm band. The optical resonator formed of the optical filter 42, the doped fiber 35, and the optical filter 36 is arranged to have its resonating optical path length and other parameters set up such that the fluorescence of 1.45 μm band is resonated therein. According to the above described arrangement, efficient amplification of the signal light of 1.3 μm band can be achieved on the same principle as that in the first embodiment.

Figure 7:
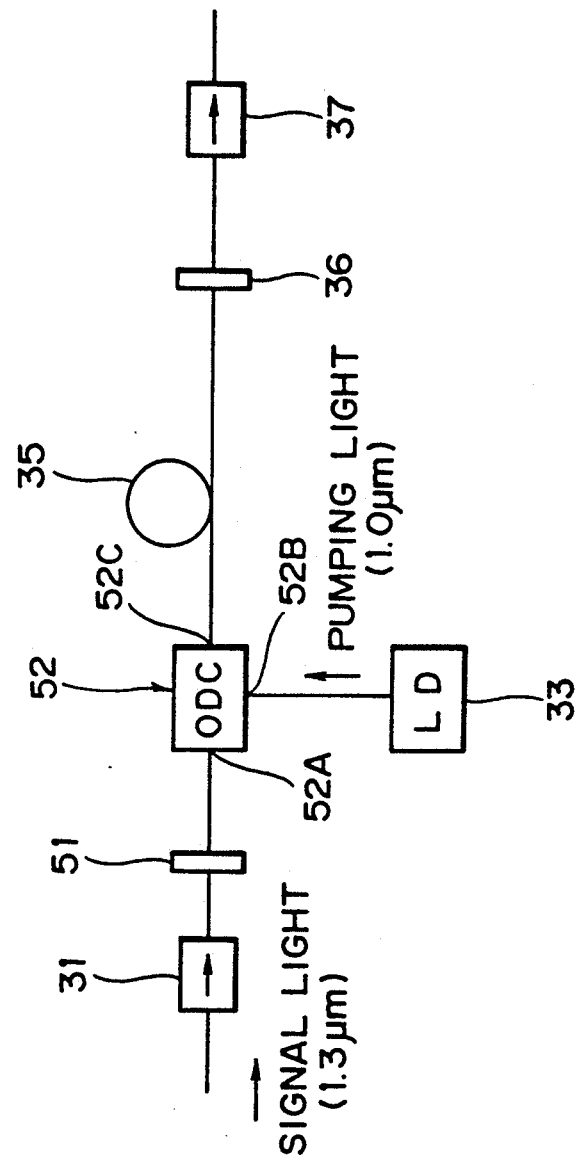
FIG. 7 lock diagram of an optical amplifier showing a third embodiment of the present invention.

FIG. 7 is a block diagram of an optical amplifier showing a third embodiment of the present invention. Signal light to be amplified is passed through an optical isolator 31 and an optical filter 51 in order of mention and supplied to a port 52A of an optical directional coupler 52. Pumping light of 1.0 μm band from an LD 33 is input to a port 52B of the optical coupler 52. Port 52C of the optical coupler 52 is connected with the first end of a doped fiber 35 and the second end of the doped fiber 35 is connected to an input port of an optical filter 36. The optical filter 51 is arranged to transmit signal light of 1.3 μm band therethrough and reflect fluorescence of 1.45 μm band. In the optical resonator formed of the optical filter 51, the optical coupler 52, the doped fiber 35, and the optical filter 36, the resonating optical path length and the like are set up so that the fluorescence of 1.45 μm band is resonated between the optical filters 51 and 36.

Figure 8:
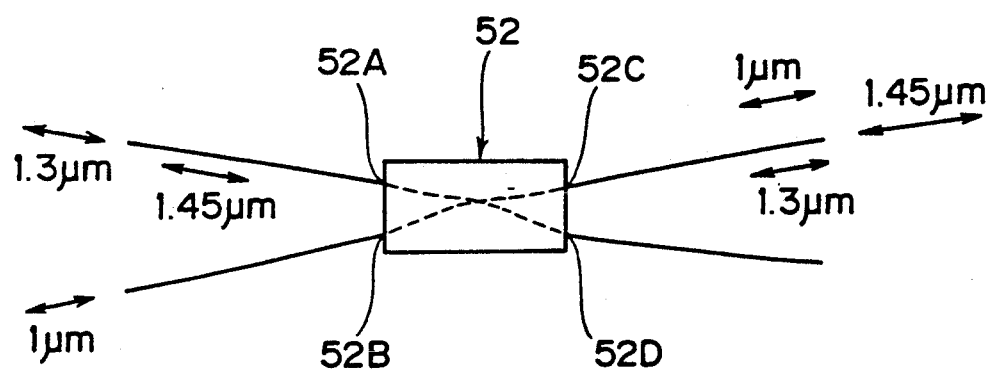
FIG. 8 is an explanatory diagram of an optical directional coupler in FIG. 7.

FIG. 8 is a diagram explanatory of the function of the optical directional coupler 52 in the third embodiment of FIG. 7. The optical directional coupler 52 functions similarly to the optical directional coupler 32 described in FIG. 5 in dealing with light of 1.0 μm band and 1.3 μm band but functions differently in dealing with light of 1.45 μm band. More specifically, light of 1.45 μm band supplied to the port 52A is output from the port 52C and light of 1.45 μm band supplied to the port 52C is reversibly output from the port 52A.

In the optical amplifier in FIG. 7, the signal light and the pumping light are supplied from the optical coupler 52 into the doped fiber 35 and, therein, the signal light is optically amplified. The fluorescence of 1.45 μm band generated in the doped fiber 35 resonates between the filters 51 and 36 and, thereby, stimulated emission takes place to increase Pr on the normal level. Hence, efficient optical amplification of the signal light of 1.3 μm band can be achieved.

Figure 9:
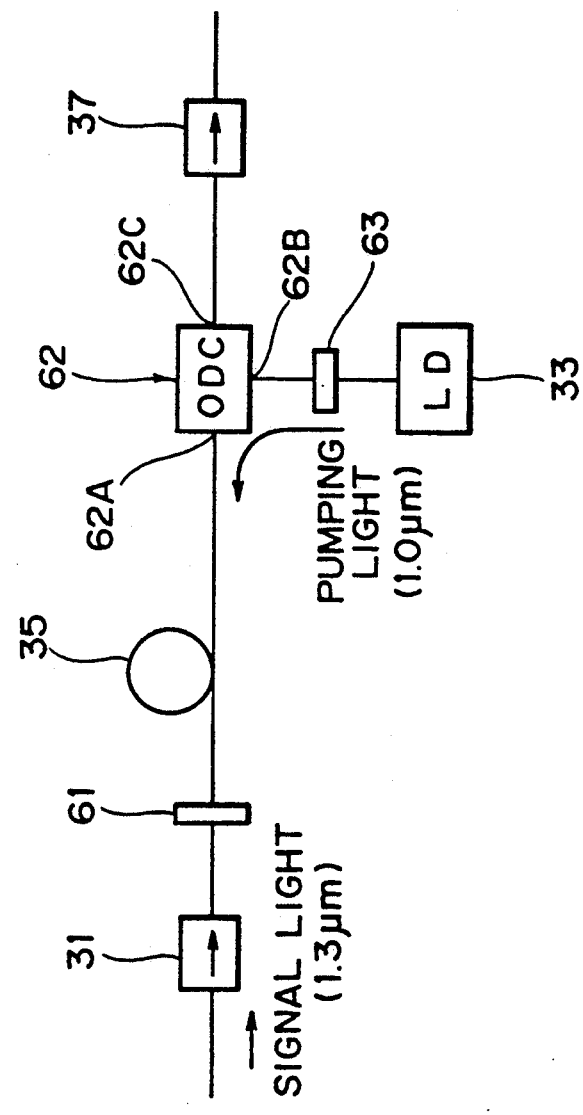
FIG. 9 is a block diagram of an optical amplifier shown in the embodiment of the present invention.

FIG. 9 is a block diagram of an optical amplifier showing a fourth embodiment of the present invention. This embodiment is characterized in that post-pumping is adopted therein. In the case where the post-pumping is practices, signal light and pumping light propagates in opposite directions to each other. Signal light of 1.3 μm band is supplied to the first end of the doped fiber 35 through an optical isolator 31 and an optical filter 61. The second end of the doped fiber 35 is connected to a port 62A of an optical directional coupler 62. An LD 33 is connected with a port 62B of the optical coupler 62 through an optical filter 63. Port 62C of the optical coupler 62 is connected to an optical isolator 37 on the output side. The pumping light of 1.0 μm band supplied to the port 62B of the optical coupler 62 is output from the port 62A to be introduced into the doped fiber 35. Although the signal light and the pumping light propagate through the doped fiber 35 in the opposite directions to each other, the signal light of 1.3 μm band is amplified in this embodiment similarly to the case of the above described embodiments where they propagate in the same direction (pre-pumping). Fluorescence of 1.45 μm band generated within the doped fiber 35 is caused to resonate between the optical filters 61 and 63, whereby stimulated emission is caused and Pr on the normal level is increased. Therefore, as the optical filter 61, that transmitting light of 1.3 μm band therethrough and reflecting light of 1.45 μm band is used, while as the optical filter 63, that transmitting light of 1.0 μm band therethrough and reflecting light of 1.45 μm band is used. As the optical coupler 62, that identical to the optical coupler 32 used in the first embodiment of FIG. 4 can be used. In this case, the ports 62A, 62B, and 62C of the optical coupler 62 correspond to the ports 32C, 32B, and 32A of the optical coupler 32, respectively. While the fourth embodiment is a change of the first embodiment of the pre-pumping type to an arrangement employing the post-pumping type, the second embodiment and the third embodiment of the pre-pumping type can also be changed into those employing the post-pumping type.

Figure 10:
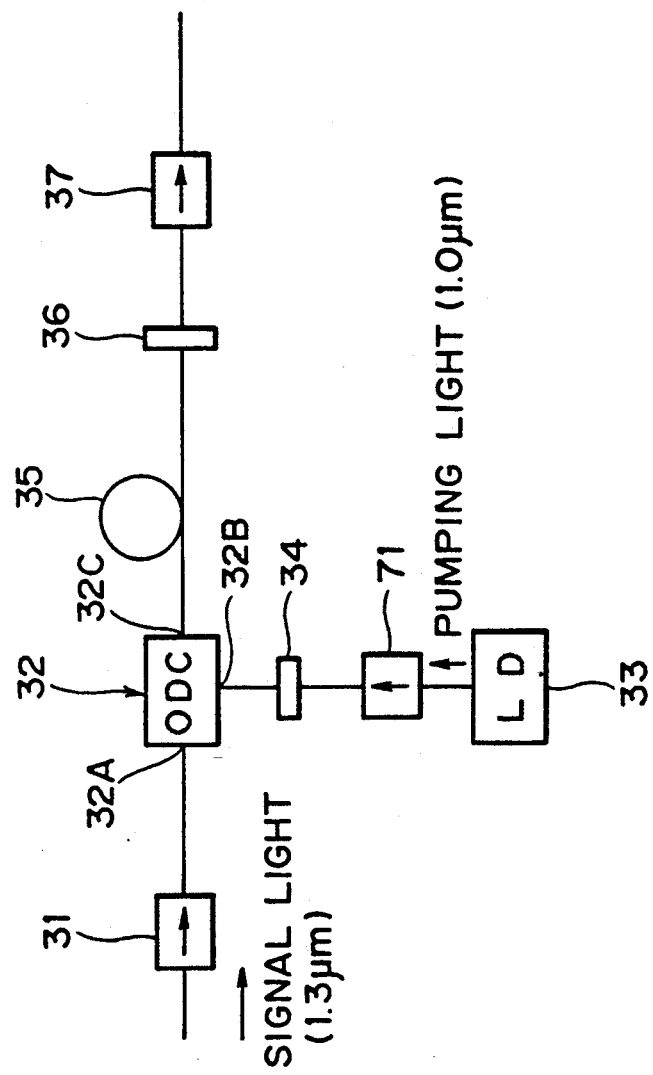
FIG. 10 is a block diagram of an optical amplifier showing a fifth embodiment of the present invention.

FIG. 10 is a block diagram of an optical amplifier showing a fifth embodiment of the present invention. This embodiment differs from the first embodiment of FIG. 4 in that there is additionally inserted an optical isolator 71 between the LD 33 and the optical filter 34. The optical isolator 71 has a function transmitting well the pumping light from the LD 33 therethrough toward the side of the optical filter 34 but blocks light input thereto from the side of the optical filter 34. By the use of such an optical isolator 71, returning of the fluorescence and pumping light to the LD 33 is prevented and, thereby, a stabilized operation of the optical amplifier can be secured.

Figure 11:
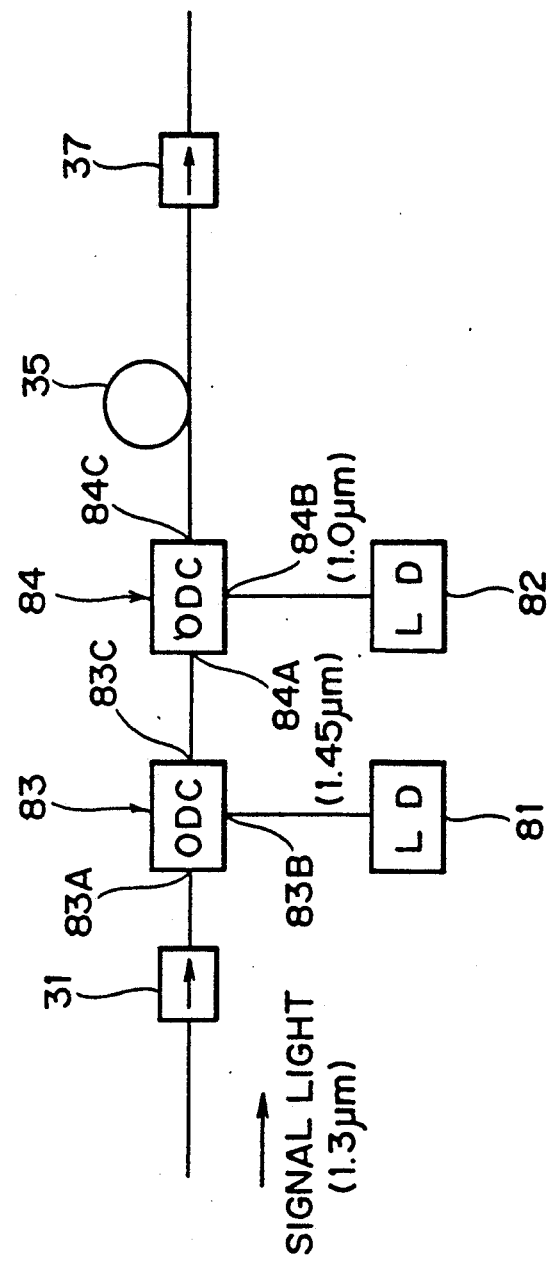
FIG. 11 is a block diagram of an optical amplifier showing a sixth embodiment of the present invention.

FIG. 11 is a block diagram of an optical amplifier showing a sixth embodiment of the present invention. This embodiment and the next seventh embodiment employ the basic configuration of FIG. 2. Namely, light with the wavelength equivalent to that of the fluorescent light is adapted to be emitted from an independent light source and introduced into the doped fiber. Particular arrangement thereof will be described below. Signal light of 1.3 μm band is supplied to the doped fiber 35 through an optical isolator 31 and optical directional couplers 83 and 84. Light of 1.45 μm band from an LD 81 is passed through the optical couplers 83 and 84 in order of mention and supplied to the doped fiber 35. Pumping light of 1.0 μm band from an LD 82 is supplied to the doped fiber 35 through the optical coupler 84. The optical coupler 83 has ports 83A, 83B, and 83C, while the optical coupler 84 has ports 84A, 84B, and 84C. The port 83A of the optical coupler 83 is supplied with the signal light, the port 83B is connected with the LD 81, and the port 83C is connected to the port 84A of the optical coupler 84. The ports 84B and 84C are connected with the LD 82 and the doped fiber 35, respectively. According to the present embodiment, the power density of the light of 1.45 μm band is increased and, hence, efficient amplification of the light of 1.3 μm band becomes achievable on the above described principle.

Figure 12:
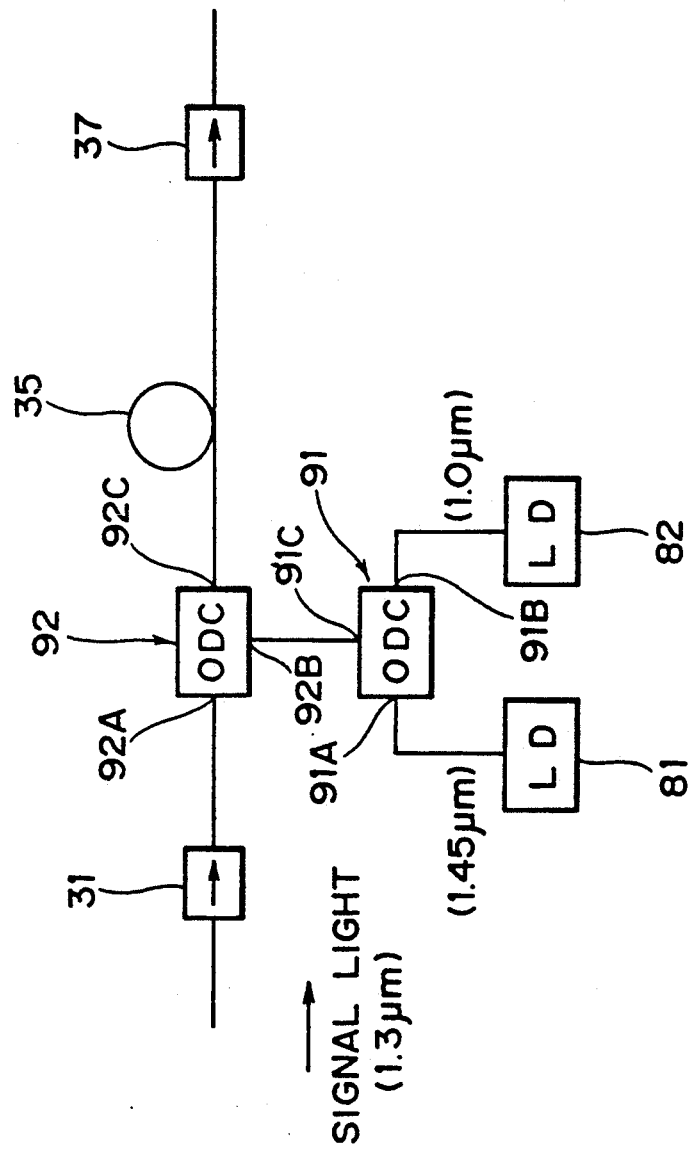
FIG. 12 is a block diagram of an optical amplifier showing a seventh embodiment of the present invention.

FIG. 12 is a block diagram of an optical amplifier showing a seventh embodiment of the present invention. Light of 1.45 μm band from an LD 81 and pumping light of 1.0 μm band from an LD 82 are supplied to a doped fiber 35 through optical directional couplers 91 and 92. Signal light of 1.3 μm band supplied through an optical isolator 31 is input to the doped fiber 35 through the optical coupler 92. The optical coupler 91 has ports 91A, 91B, and 91C, while the optical coupler 92 has ports 92A, 92B, and 92C. In the optical coupler 91, the ports 91A and 91B are connected with the LDs 81 and 82, respectively, and the port 91C is connected to the port 92B of the optical coupler 92. In the optical coupler 92, the port 92A is supplied with the signal light and the port 92C is connected with the doped fiber 35. This optical amplifier, like the optical amplifier of FIG. 11, has a merit that it can efficiently amplify the signal light of 1.3 μm band. Although, in the embodiments of FIG. 11 and FIG. 12, both the optical directional couplers are provided on the upstream side of the doped fiber 35 in the propagating direction of the signal light, they may be provided on the downstream side of the doped fiber 35.

Figure 13:
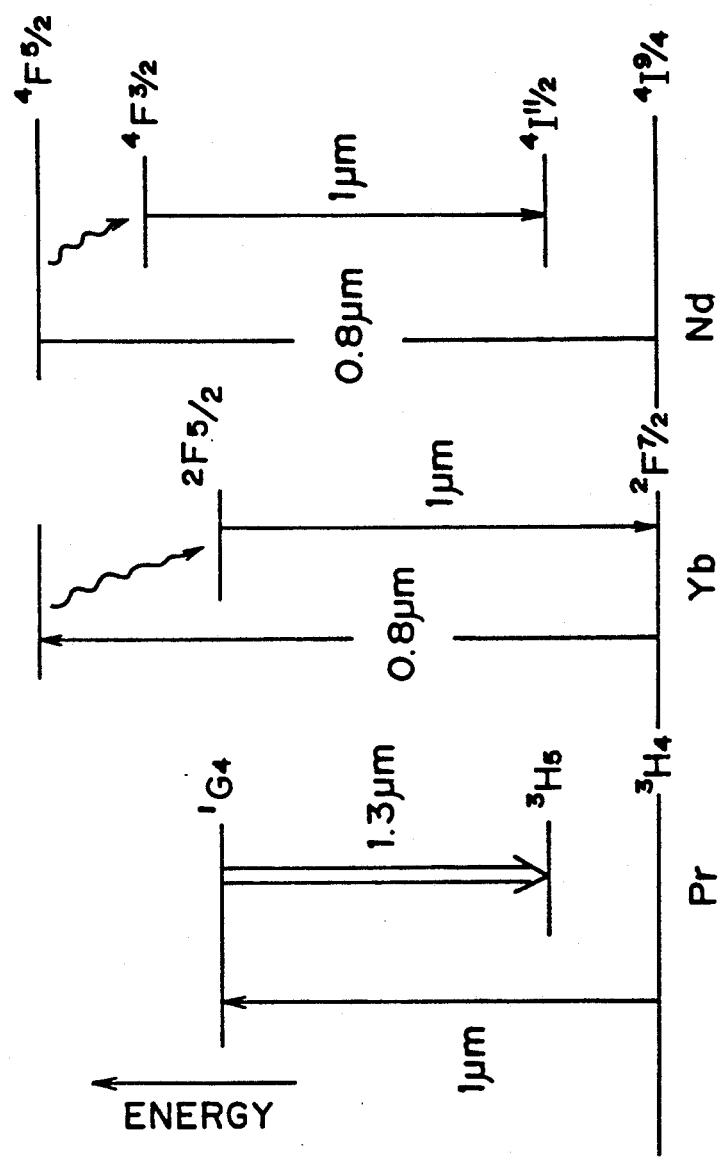
FIG. 13 is an explanatory diagram of the principle of optical amplification in further different basic configurations of optical amplifiers according to the present invention.

FIG. 13 is an explanatory diagram of the principle of optical amplification in two further basic configurations of the optical amplifier according to the present invention. Need for these basic configurations arises when suitable LDs outputting pumping light of 1.0 μm band are difficult to obtain and therefore it is attempted to use LDs outputting 0.8 μm band, instead. In these two basic configurations, Pr (praseodymium) is excited to amplify signal light of 1.3 μm band with light of 1.0 μm band obtained by exciting Nd (neodymium) and/or Yb (ytterbium) with light of 0.8 μm band. In one of these two basic configurations, light of 0.8 μm band is supplied to an optical waveguide arrangement doped with Pr together with Nd and/or Yb. In the other of the two basic configurations, light of 0.8 μm band is supplied to a laser resonator whose resonating optical path is doped with Nd and/or Yb and, thereby, light of 1.0 μm band is obtained to be supplied to an optical waveguide arrangement doped with Pr.

Referring to FIG. 13, Yb at the normal level $^2F_{7/2}$ is transited to an energy level $^2F_{5/2}$ after being excited by the light of 0.8 μm band. When Yb transits from the energy level $^2F_{5/2}$ to the normal level $^2F_{7/2}$, fluorescence of 1.0 μm band is generated. On the other hand, Nd at the normal level $^4I_{9/2}$ is transited to an energy level $^4F_{5/2}$ by being excited by the light of 0.8 μm band and when it, after transiting to an energy level $^4F_{3/2}$, transits to an $^4I_{11/2}$, fluorescence of 1.0 μm band is generated. The fluorescence of 1.0 μm band is used to excite Pr from the normal level $^3H_4$ to an energy level $^1G_4$. When the excited Pr transits to an energy level $^3H_5$, stimulated emission at 1.3 μm band is generated and, thereby, efficient amplification of the signal light of 1.3 μm band is achieved. Some embodiments on the above described principle will be described below.

Figure 14:
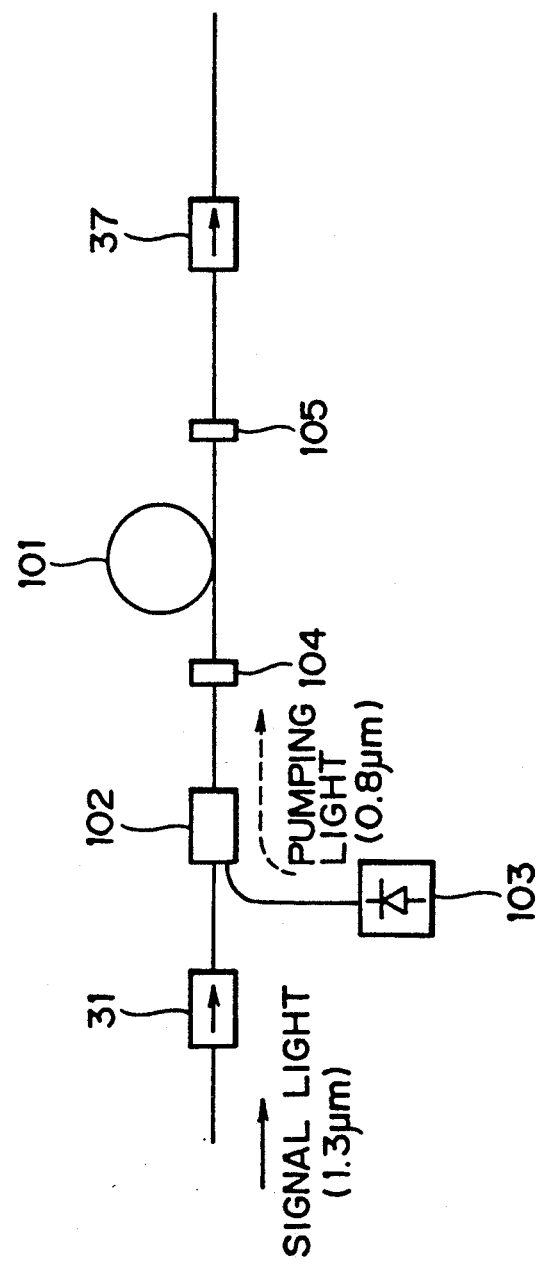
FIG. 14 is a block diagram of an optical amplifier showing an eighth embodiment of the present invention.

FIG. 14 is a block diagram of an optical amplifier showing an eighth embodiment of the present invention. In this embodiment, an optical fiber resonator for 1.0 μm band is constructed with a doped fiber 101 doped with Nd and Pt. To the resonator, signal light of 1.3 μm band and pumping light of 0.8 μm band are supplied. The signal light is passed through an optical isolator 31 and an optical directional coupler 102 in order of mention and supplied to the doped fiber 101. The pumping light of 0.8 μm band from an LD 103 is supplied to the doped fiber 101 through the optical coupler 102. On both ends of the doped fiber 101, there are disposed optical filters 104 and 105 for reflecting light of 1.0 μm band at a suitable reflectivity so that a resonator length for light of 1.0 μm band is provided therebetween. Within the doped fiber 101, resonance is produced by fluorescence at 1.0 μm band generated by Nd excited by the light of 0.8 μm band, and Pr absorbing the light of 1.0 μm band is brought into an excited state and, thereby, the signal light is amplified. The amplified signal light is transmitted over a transmission line, not shown, through an optical isolator 37. Thus, in the present embodiment, efficient amplification of the signal light of 1.3 μm band can be achieved by the use of the LD 103 for 0.8 μm band.

Figure 15:
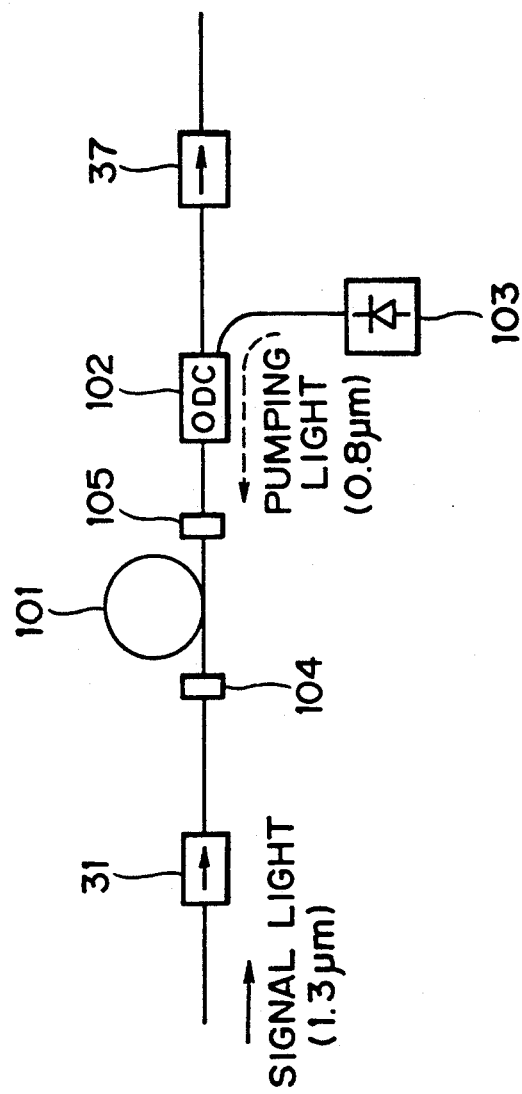
FIG. 15 is a block diagram of an optical amplifier showing a ninth embodiment of the present invention.

The interconnections of parts in FIG. 14 may be changed to organize an optical amplifier of a post-pumping type as shown in FIG. 15 (the ninth embodiment). While doped fibers doped with Nd and Pr were used in the embodiments of FIG. 14 and FIG. 15, a doped fiber doped with Yb and Pr or a doped fiber doped with Nd, Yb, and Pr may be used.

FIG. 16 is a block diagram of an optical amplifier showing a 10th embodiment of the present invention. In this embodiment, a doped fiber 111 doped with Nd is used for constructing an optical fiber laser and output light of 1.0 μm band from the optical fiber laser is supplied to a doped fiber 35 doped with Pt. Signal light of 1.3 μm band is passed through an optical isolator 31 and an optical directional coupler 112 in order of mention and supplied to the Pt-doped fiber 35. Pumping light of 0.8 μm band from an LD 103 is supplied to the Nd-doped fiber 111. The doped fiber 111 is provided at its both ends with optical filters 113 and 114 reflecting the light of 1.0 μm band at suitable reflectivity and, thereby, a laser resonator is formed. Nd brought to an excited state by the pumping light of 0.8 μm band generates fluorescence of 1.0 μm band and this fluorescence resonates between the optical filters 113 and 114 and, thereby, laser oscillation is produced. The light of 1.0 μm band transmitted through the optical filter 113 is passed through an optical isolator 115 and an optical coupler 112 in order of mention and supplied to the Pt-doped fiber 35. Within the doped fiber 35, Pr absorbing the light of 1.0 μm band is brought into an excited states and, thereby, amplification of the signal light of 1.3 μm band is effected. The amplified signal light is transmitted over a transmission line, not shown, through an optical isolator 37. In the present embodiment, since the light of 1.0 μm band having sufficient power is obtained by applying the pumping light of 0.8 μm band to the optical fiber laser and the thus obtained light is supplied to the Pt-doped fiber 35, efficient amplification of the signal light of 1.3 μm band can be achieved.

FIG. 17 is a block diagram of an optical amplifier showing an 11th embodiment of the present invention. In this embodiment, the arrangement of the optical fiber laser is changed from that in the embodiment of FIG. 16. Namely, pumping light of 0.8 m band from an LD 103 is passed through an optical directional coupler 121 and an optical isolator 122 and supplied to a doped fiber 111 doped with Nd. Fluorescence of 1.0 m band generated within the doped fiber 111, on the one hand, is passed through the optical coupler 121 and the optical isolator 122 and introduced again into the doped fiber 111 to thereby cause stimulated emission of 1.0 μm band, and on the other hand, is split by the optical coupler 121, passed through an optical isolator 115 and an optical coupler 112, and supplied to a Pt-doped fiber 35. Signal light of 1.3 μm band is passed through an optical isolator 31 and the optical coupler 112 and supplied to the Pr-doped fiber 35. Within the doped fiber 35, Pr absorbing the light of 1.0 μm band is brought into an excited state and, thereby, the signal light of 1.3 μm band is amplified. The amplified signal light is passed through an optical isolator 37 and transmitted over an optical transmission line, not shown. Thus, efficient optical amplification can be achieved also in the present embodiment by using the LD for 0.8 μm band.

While pre-pumping was employed in the embodiments of FIG. 16 and FIG. 17, post-pumping may be employed. Further, instead of the Nd-doped fiber 111, a doped fiber doped with Yb or a doped fiber doped with Nd and Yb may be used.

While the invention has been described with reference to particular embodiments, these embodiments are given by way of illustration only and not limitative of the present invention. For example, while doped fibers were used above as optical waveguides doped with rare earth elements, other types of optical waveguide arrangements such as a solid state optical waveguide may be used. The scope of the invention is defined by the appended claims and all changes and modifications as fall within the equivalence of the scope of the claims are therefore to be embraced by the invention.

What is claimed is:

1. An optical amplifier amplifying signal light of 1.3 μm band comprising:
   an optical waveguide having a waveguide region which is doped with Pr and of which a first end is supplied with said signal light;
   pumping means for causing optical excitation in said waveguide region; and
   booster means for increasing power density of fluorescence of 1.45 μm band generated in said waveguide region incidentally to optical amplification of said signal light; wherein
   said signal light undergone amplification is output from a second end of said waveguide region.

2. An optical amplifier according to claim 1, wherein said optical waveguide is a doped fiber whose principal ingredient is SiO2, and said waveguide region is the core of said doped fiber.

3. An optical amplifier according to claim 1, wherein said pumping means comprises a first light source outputting pumping light of 1.0 μm band, and
   said optical amplifier further comprises optical coupling means for supplying said pumping light from said first light source to said waveguide region.

4. An optical amplifier according to claim 3, wherein said optical coupling means is disposed on the upstream side of said optical waveguide in the propagating direction of said signal light, and said pumping light is supplied to said waveguide region from said first end to propagate in the same direction as that in which said signal light propagates.

5. An optical amplifier according to claim 3, wherein said optical coupling means is disposed on the downstream side of said optical waveguide in the propagating direction of said signal light, and said pumping light is supplied to said waveguide region from said second end to propagate in the opposite direction to that in which said signal light propagates.

6. An optical amplifier according to claim 3, wherein said booster means comprises a first optical filter disposed on the upstream side of said optical waveguide in the propagating direction of said signal light for reflecting said fluorescence and a second optical filter disposed on the downstream side of said optical waveguide in the propagating direction of said signal light for both reflecting said fluorescence and transmitting therethrough said signal light undergone amplification, and wherein
   an optical resonator arrangement for said fluorescence is formed between said first and second optical filters and a resonating optical path of said optical resonator arrangement includes said waveguide region.

7. An optical amplifier according to claim 3, wherein said booster means comprises a second light source operatively connected with said optical coupling means for supplying light of 1.45 μm band to said waveguide region.

8. An optical amplifier according to claim 6, wherein said optical coupling means comprises an optical directional coupler having a first, a second, and a third port, said second port operatively connected with said first light source and said third port operatively connected with said first end of said waveguide region, and said optical directional coupler outputs both said signal light supplied to said first port and said pumping light supplied to said second port from said third port.

9. An optical amplifier according to claim 8, wherein said first optical filter is disposed between said second port of said optical directional coupler and said first light source, said first optical filter further transmitting said pumping light therethrough, said second optical filter is operatively connected with said second end of said waveguide region, and said resonating optical path further includes said second and third ports.

10. An optical amplifier according to claim 8, wherein said first optical filter is disposed between said third port of said optical directional coupler and said first end of said waveguide region, said first optical filter further transmitting said signal light and said pumping light therethrough, and said second optical filter is operatively connected with said second end of said waveguide region.

11. An optical amplifier according to claim 8, wherein said first optical filter is operatively connected to said first port of said optical directional coupler, said first optical filter further transmitting said signal light therethrough, said second optical filter is operatively connected with said second end of said waveguide region, and said resonating optical path further includes said first and third ports.

12. An optical amplifier according to claim 8, wherein said second optical filter further reflects said pumping light.

13. An optical amplifier according to claim 7, wherein said optical coupling means comprises a first optical directional coupler having a first, a second, and a third port and a second optical directional coupler having a fourth, a fifth, and a sixth port, said second port operatively connected with said second light source, said third port operatively connected to said fourth port, said fifth port operatively connected with said first light source, and said sixth port operatively connected to said first end of said waveguide region, said first optical directional coupler outputs both said signal light supplied to said first port and said light of 1.45 μm band supplied to said second port from said third port, and said second optical directional coupler outputs both light supplied to said fourth port and said pumping light supplied to said fifth port from said sixth port.

14. An optical amplifier according to claim 7, wherein said optical coupling means comprises a first optical directional coupler having a first, a second, and a third port and a second optical directional coupler having a fourth, a fifth, and a sixth port, said first port operatively connected with said second light source, said second port operatively connected with said first light source, said third port operatively connected to said fifth port, and said sixth port operatively connected to said first end of said waveguide region, said first optical directional coupler outputs both said light of 1.45 μm band supplied to said first port and said pumping light supplied to said second port from said third port, and said second optical directional coupler outputs both said signal light supplied to said fourth port and light supplied to said fifth port from said sixth port.

15. An optical amplifier amplifying signal light of 1.3 μm band comprising:
   an optical waveguide having a waveguide region which is doped with Pr and at least one of, Nd and Yb of which a first end is supplied with said signal light;
   a light source outputting light of 0.8 μm band;

optical coupling means for supplying said light of 0.8 μm band from said light source to said waveguide region; and a first and a second optical filter disposed on the upstream and downstream sides of said waveguide region in the propagating direction of said signal light, respectively, for reflecting light of 1.0 μm band; wherein an optical resonator arrangement for said light of 1.0 μm band is formed between said first and second optical filters, said optical resonator arrangement having a resonating optical path including said waveguide region, and said signal light undergone amplification is output from a second end of said waveguide region.

16. An optical amplifier amplifying signal light of 1.3 μm band comprising:

an optical waveguide having a waveguide region which is doped with Pr and of which a first end is supplied with said signal light;

pumping means for outputting light of 1.0 μm band for causing optical excitation in said waveguide region; and optical coupling means for supplying said light of 1.0 μm band from said pumping means to said waveguide region; wherein said pumping means includes a laser resonator of which resonating optical path is doped with at least either of Nd and Yb and means for supplying said laser resonator with light of 0.8 μm band, and said signal light undergone amplification is output from a second end of said waveguide region.

* * * * *